US012726645B2

(12) United States Patent
Zhao et al.

(10) Patent No.: US 12,726,645 B2
(45) Date of Patent: Sep. 1, 2026

(54) TRANSFORM SELECTION FOR INTRA PREDICTION FUSION

(71) Applicant: Tencent America LLC, Palo Alto, CA (US)

(72) Inventors: Xin Zhao, San Jose, CA (US); Guichun Li, San Jose, CA (US); Lien-Fei Chen, Hsinchu (TW); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 80 days.

(21) Appl. No.: 18/381,508

(22) Filed: Oct. 18, 2023

(65) Prior Publication Data

US 2024/0137542 A1 Apr. 25, 2024
US 2024/0236349 A9 Jul. 11, 2024

Related U.S. Application Data

(60) Provisional application No. 63/417,649, filed on Oct. 19, 2022.

(51) Int. Cl.
*H04N 19/44* (2014.01)
*H04N 19/11* (2014.01)
(Continued)

(52) U.S. Cl.
CPC ............. *H04N 19/44* (2014.11); *H04N 19/11* (2014.11); *H04N 19/12* (2014.11); *H04N 19/159* (2014.11); *H04N 19/176* (2014.11)

(58) Field of Classification Search
CPC .. H04N 19/176; H04N 19/105; H04N 19/159; H04N 19/593; H04N 19/70;
(Continued)

(56) References Cited

U.S. PATENT DOCUMENTS

2022/0329800 A1* 10/2022 Ray ..................... H04N 19/176

FOREIGN PATENT DOCUMENTS

WO 2012172791 A1 12/2012

OTHER PUBLICATIONS

C. Muhammed, et al., Algorithm description of Enhanced Compression Model 6 (ECM 6), Joint Video Experts Team (JVET) of ITU-T SG 16 WP 3 and ISO/IEC JTC 1/SC 29 27th Meeting, by teleconference, Jul. 13-22, 2022, Document; JVET-AA2025, pp. 1-53.

(Continued)

*Primary Examiner* — Farhan Mahmud
(74) *Attorney, Agent, or Firm* — ARENTFOX SCHIFF LLP

(57) ABSTRACT

Aspects of the disclosure include methods and apparatuses for video coding. One of the apparatuses includes processing circuitry that receives a current block in a bitstream. The current block is predicted with intra prediction fusion comprising multiple candidate intra prediction modes. The processing circuitry derives a dominant intra prediction mode from the multiple candidate intra prediction modes. The processing circuitry applies a transform from a transform set associated with the dominant intra prediction mode for the current block and decodes the current block according to the transform.

17 Claims, 12 Drawing Sheets

(51) Int. Cl.
*H04N 19/12* (2014.01)
*H04N 19/159* (2014.01)
*H04N 19/176* (2014.01)

(58) Field of Classification Search
CPC ........ H04N 19/11; H04N 19/82; H04N 19/44; H04N 19/136; H04N 19/107; H04N 19/52
See application file for complete search history.

(56) References Cited

OTHER PUBLICATIONS

ITU-T Study Group. "Versatile video coding, Series H: Audiovisual and multimedia systems: Infrastructure of audiovisual services—coding of moving video." in General Secretariat and Telecom Radiocommunication (ITU-R) Standardization (ITU-T), sec. H 266, Aug. 2020, pp. 1-516.
International Search Report and Written Opinion issued in Application No. PCT/US2023/077317, mailed Feb. 14, 2024, 12 pages.
Office Action received in Japanese Patent Application No. 2025-521444, mailed on May 19, 2026, 11 pages (5 pages of Original Document and 6 pages of English Translation).

* cited by examiner

TRANSFORM SELECTION FOR INTRA PREDICTION FUSION

INCORPORATION BY REFERENCE

The present application claims the benefit of priority to U.S. Provisional Application No. 63/417,649, "Transform selection for intra prediction fusion" filed on Oct. 19, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a current block in a bitstream. The current block is predicted with intra prediction fusion comprising multiple candidate intra prediction modes. The processing circuitry derives a dominant intra prediction mode from the multiple candidate intra prediction modes. In an example, the processing circuitry applies a transform from a transform set associated with the dominant intra prediction mode for the current block and decodes the current block according to the transform.

In an example, the processing circuitry selects the transform for the current block in the transform set associated with the dominant intra prediction mode and performs an inverse transform on the current block according to the selected transform.

In an example, the transform set associated with the dominant intra prediction mode includes a primary transform set, the processing circuitry selects a primary transform for the current block in the primary transform set associated with the dominant intra prediction mode and performs an inverse primary transform on the current block according to the selected primary transform.

In an example, the transform set associated with the dominant intra prediction mode includes a secondary transform set, the processing circuitry selects a secondary transform for the current block in the secondary transform set associated with the dominant intra prediction mode, and performs an inverse secondary transform on the current block according to the selected secondary transform.

In an example, the transform set associated with the dominant intra prediction mode includes a primary transform set and a secondary transform set, the processing circuitry selects a primary transform for the current block in the primary transform set and selecting a secondary transform for the current block in the secondary transform set, the transform including the secondary transform and the primary transform, and performs an inverse secondary transform according to the selected secondary transform and an inverse primary transform on the current block according to the selected primary transform.

In an example, the processing circuitry determines respective frequencies that the multiple candidate intra prediction modes are applied to neighboring coded blocks and selects the most frequently applied candidate intra prediction mode in the multiple candidate intra prediction modes as the dominant intra prediction mode.

In an example, the processing circuitry derives the dominant intra prediction mode based on neighboring reconstructed samples of the current block, the neighboring reconstructed samples including reconstructed samples within M lines of the current block.

In an example, the processing circuitry calculates a histogram of edge directions of the current block based on the neighboring reconstructed samples of the current block. The histogram of edge directions indicates respective frequencies of the edge directions. The processing circuitry selects a candidate intra prediction mode that is associated with the most frequently used edge direction in the edge directions as the dominant intra prediction mode. The selected candidate intra prediction mode can be one of the multiple candidate intra prediction modes.

In an example, the processing circuitry calculates template matching costs between a current template including the neighboring reconstructed samples of the current block and respective templates of the current template that are indicated by the multiple candidate intra prediction modes and selects a candidate intra prediction mode associated with the least template matching cost in the template matching costs as the dominant intra prediction mode, the selected candidate intra prediction mode being one of the multiple candidate intra prediction modes.

In an example, the multiple candidate intra prediction modes include one or more of a DC mode, a planar mode, an intra directional prediction mode, a decoder-side intra mode derivation (DIMD) mode, a template based intra mode derivation (TIMD) mode, a cross-component linear model (CCLM), a convolutional cross-component model (CCCM), and a multi-model linear mode (MMLM).

In an aspect, the processing circuitry obtains a transform set that is different from multiple transform sets associated with the multiple candidate intra prediction modes and selects a transform for the current block from the obtained transform set. The processing circuitry performs an inverse transform on the current block according to the selected transform.

In an example, the processing circuitry generates the transform set using transform sets associated with at least two candidate intra prediction modes in the multiple candidate intra prediction modes. The multiple transform sets includes the transform sets associated with at least two candidate intra prediction modes.

In an example, the generated transform set includes a transform candidate from each of the transform sets.

In an example, a number of transform candidates of the generated transform set is equal to a number of transform candidates of each of the transform sets.

In an example, a number of transform candidates of the generated transform set is different from a number of transform candidates of one of the transform sets.

In an example, the transform set is pre-defined and includes a transform that is not included in any transform set that is associated with the multiple candidate intra prediction modes.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
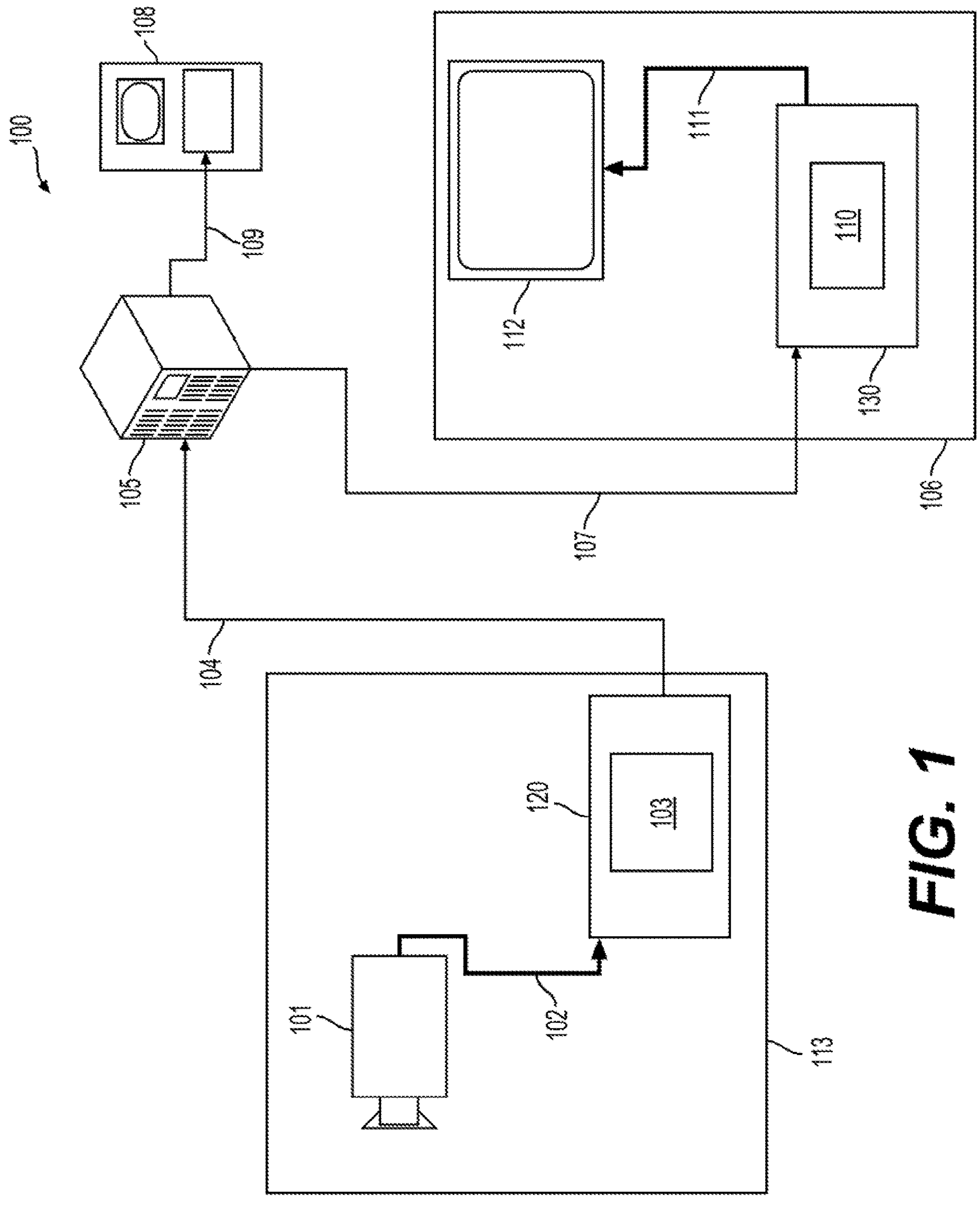
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
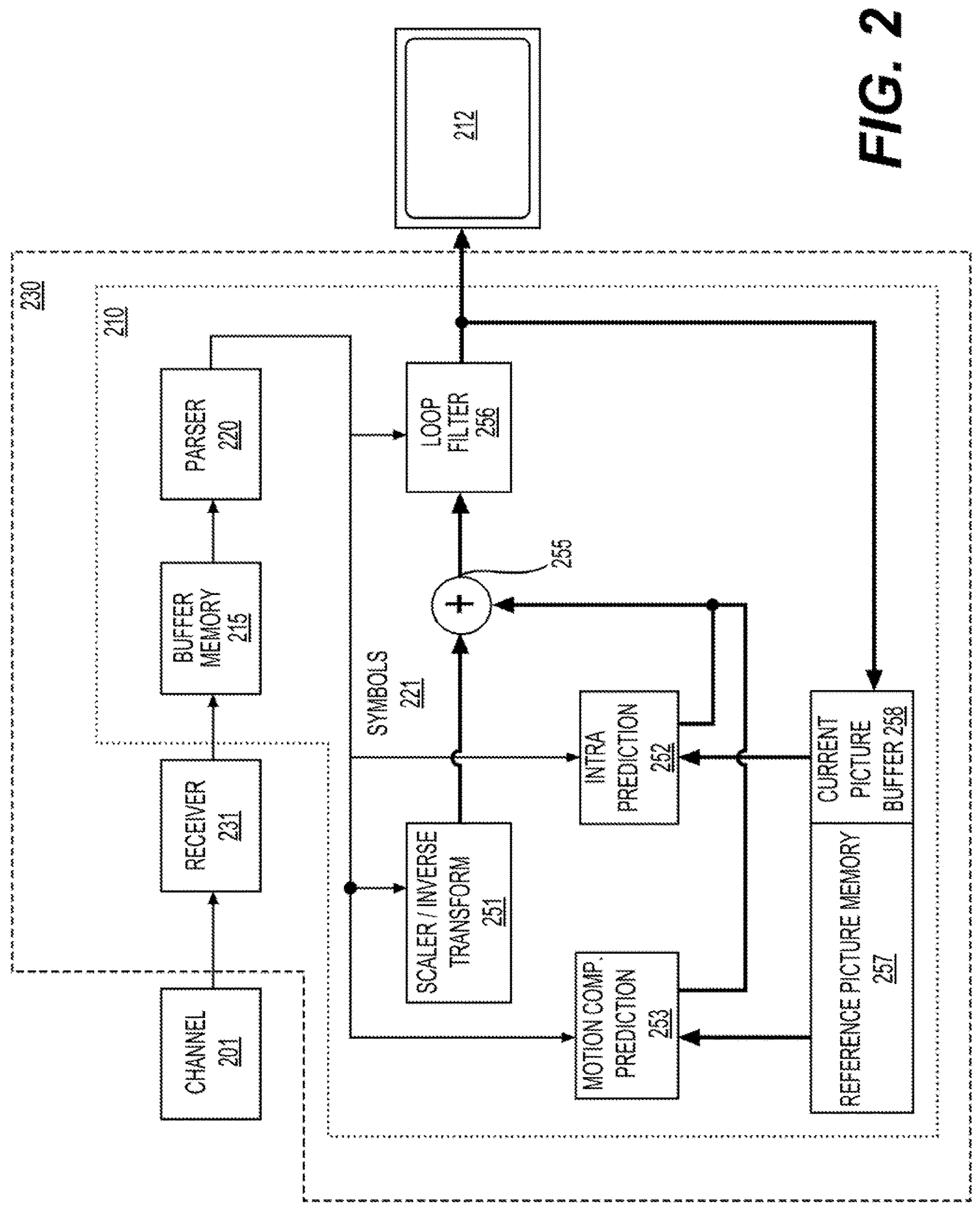
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
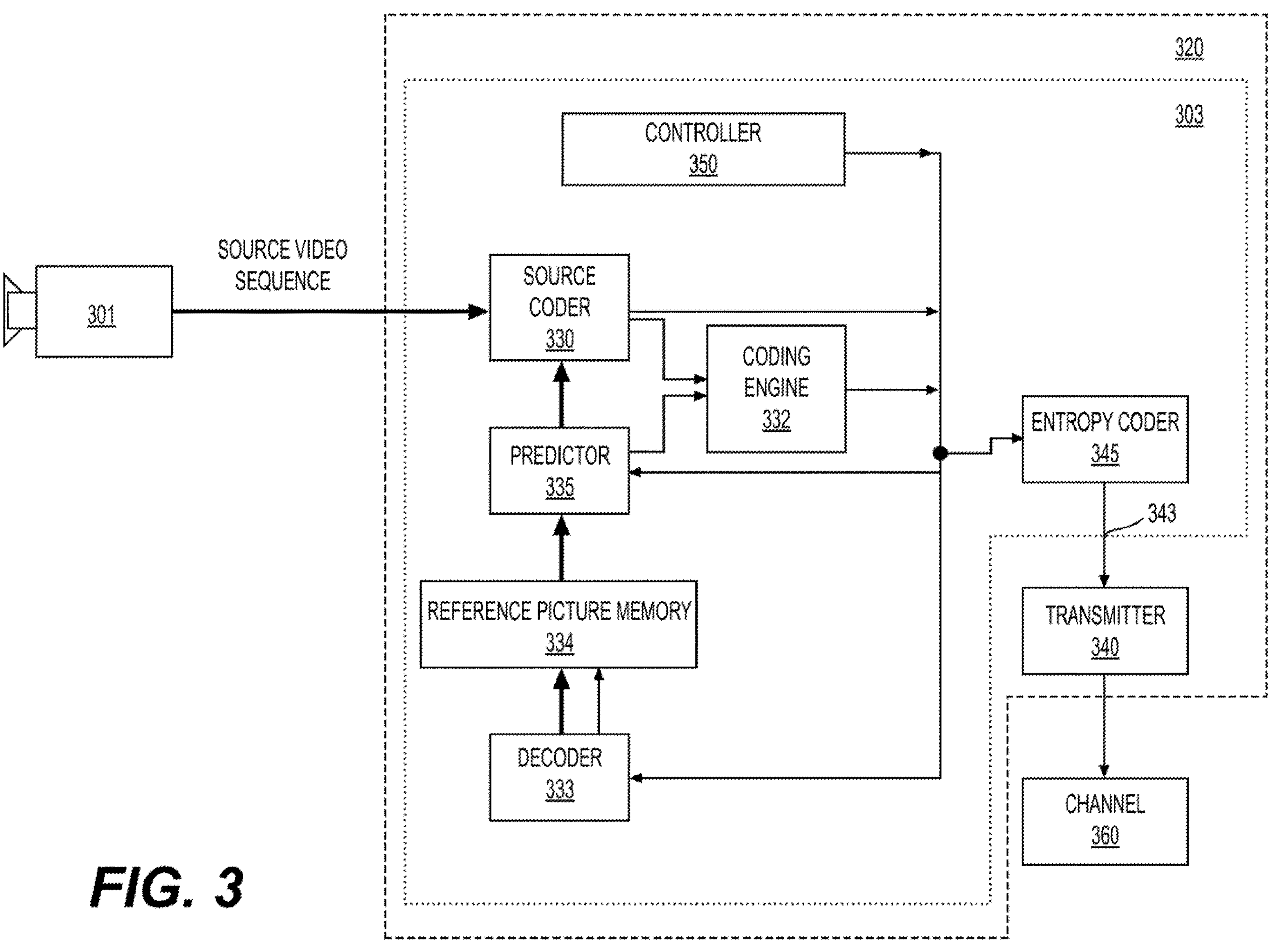
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Figure 4:
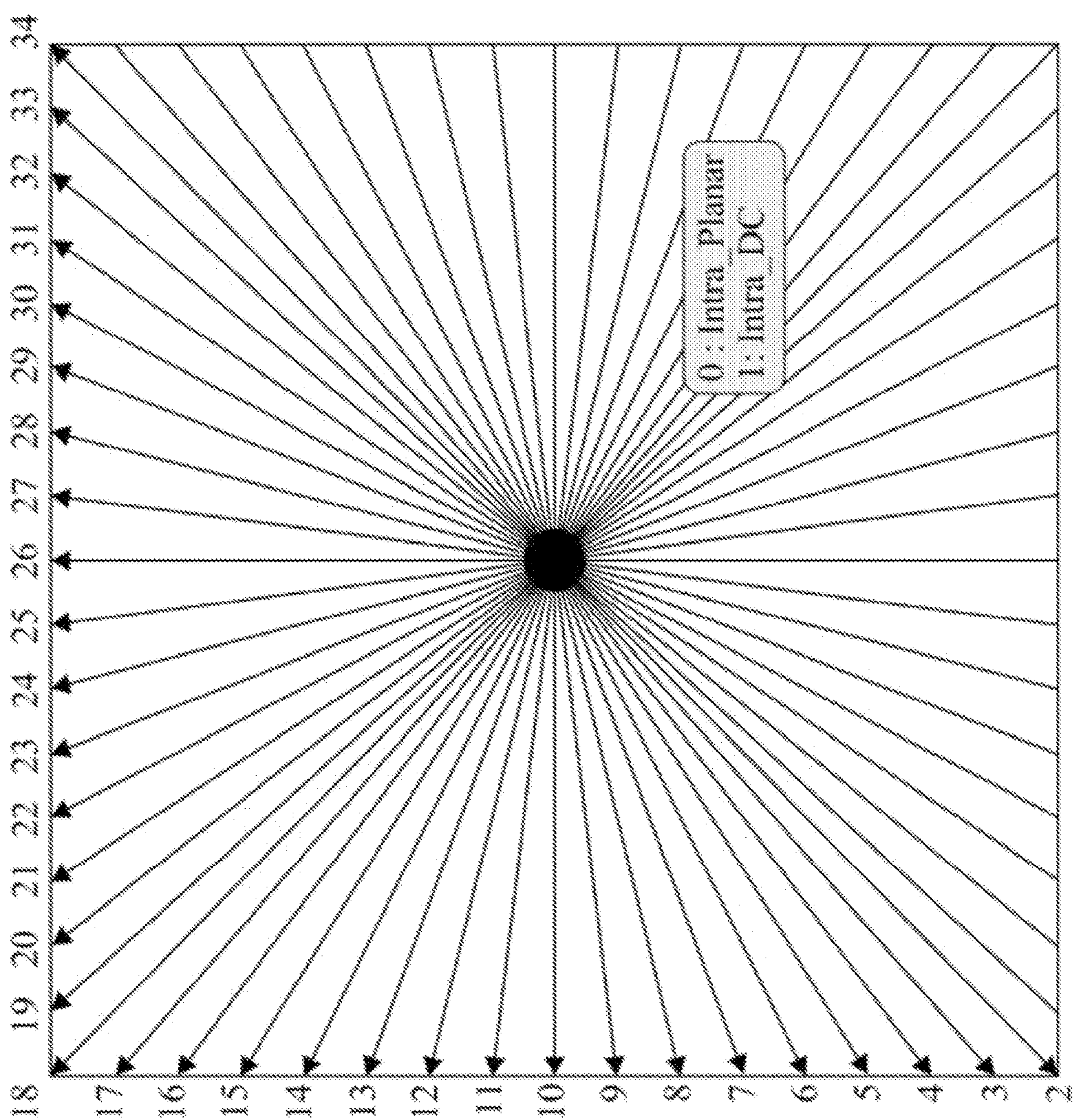
FIG. 4 shows intra prediction modes according to embodiments of the disclosure.

Various intra prediction modes for intra prediction can be used in video coding such as in HEVC and VVC. FIG. 4 shows intra prediction modes (e.g., 35 intra prediction modes such as used in HEVC) according to embodiments of the disclosure. In an example, such as in HEVC, there are 35 intra prediction modes (e.g., a total of 35 intra prediction modes). Referring to FIG. 4, among the 35 intra prediction modes, a mode 10 is a horizontal mode, a mode 26 is a vertical mode, and a mode 2, a mode 18, and mode 34 are diagonal modes. The intra prediction modes can be signaled by three most probable modes (MPMs) and 32 remaining modes.

Figure 5:
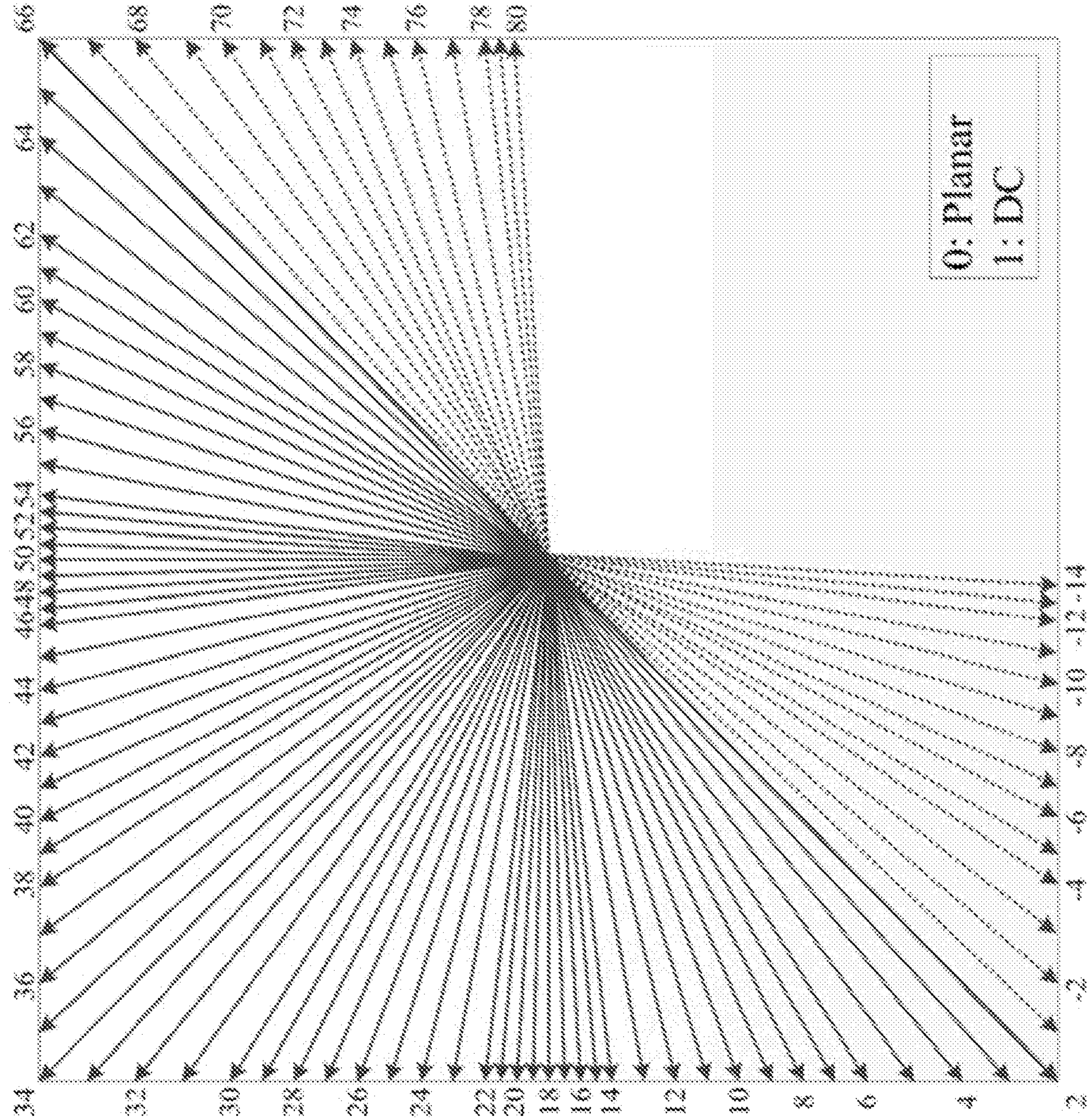
FIG. 5 shows intra prediction modes according to an embodiment of the disclosure.

FIG. 5 shows intra prediction modes, such as intra prediction modes defined in VVC draft 2, according to an embodiment of the disclosure. Referring to FIG. 5, in an example of VVC, there are 95 intra prediction modes (e.g., a total of 95 intra prediction modes). In an example, the 95 intra prediction modes are indicated by modes −14 to 80. For example, the mode 18 is a horizontal mode, the mode 50 is a vertical mode, and the mode 2, the mode 34 and the mode 66 are diagonal modes. Modes −1~−14 and Modes 67~80 can be called Wide-Angle Intra Prediction (WAIP) modes.

Figure 6:
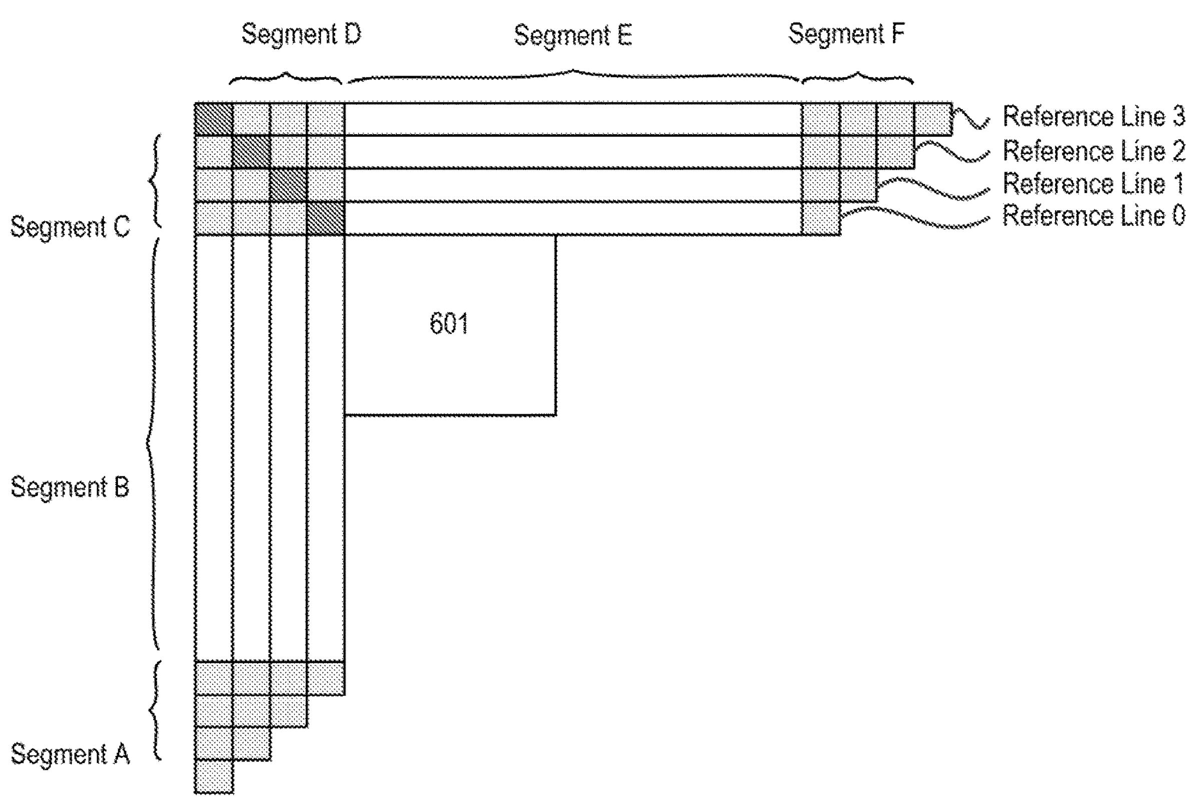
FIG. 6 shows an example of 4 reference lines 0-3 adjacent to a coding block unit according to an embodiment of the disclosure.

Multi-line intra prediction can be applied to video coding. In multi-line intra prediction, more reference lines (e.g., more than a reference line that is adjacent to a current block to be coded) can be used for intra prediction. An encoder can decide and signal which reference line is used to generate an intra predictor. A reference line index can be signaled before intra prediction modes. In an example, only the most probable modes are allowed in case a nonzero reference line index is signaled. FIG. 6 shows an example of 4 reference lines 0-3 adjacent to a coding block unit (e.g., a block) (601) according to an embodiment of the disclosure. In an embodiment, each reference line includes six segments, i.e., Segments A to F, together with a top-left reference sample. In an example, Segments A and F are padded with the closest samples from Segments B and E, respectively.

Figure 7:
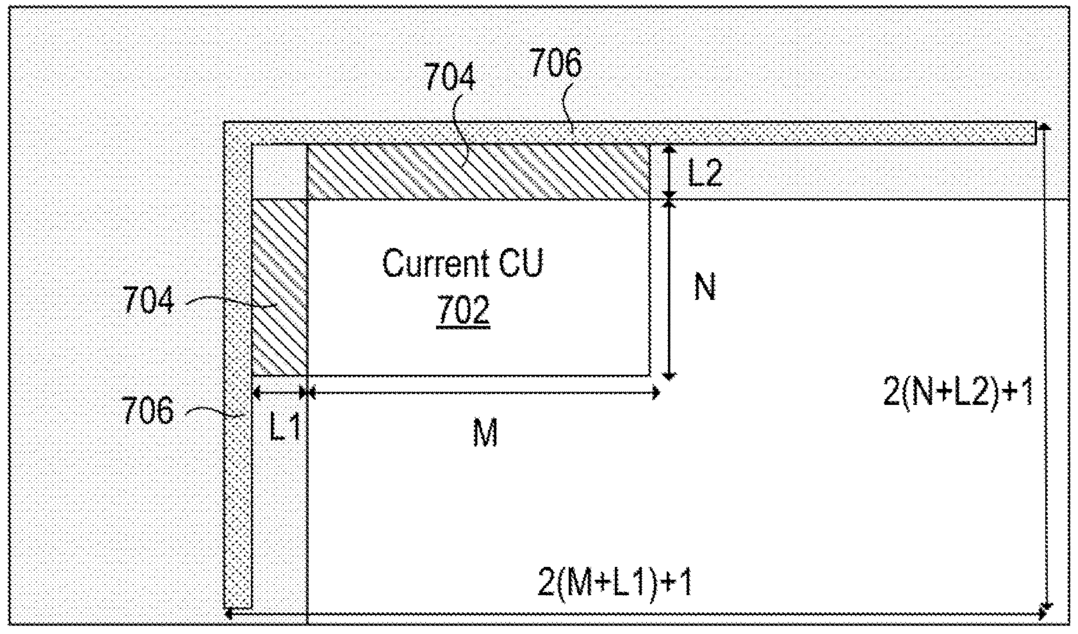
FIG. 7 shows an example of template-based intra mode derivation (TIMD).

Template-based intra mode derivation (TIMD) can use reference samples of a current CU as a template and select an intra mode among a set of candidate intra prediction modes that is associated with TIMD. The selected intra mode may be determined as a best intra mode based on a cost function, for example. As shown in FIG. 7, neighboring reconstructed samples of the current CU (702) can be used as a template (704). Reconstructed samples in the template (704) can be compared with prediction samples of the template (704). The prediction samples can be generated using reference samples (706) of the template (704). The reference samples (706) can be neighboring reconstructed samples around the template (704). A cost function can be used to calculate a cost (or distortion) between the prediction samples and the reconstructed samples in the template (704) based on a respective one of the set of candidate intra prediction modes. An intra prediction mode with a minimum cost (or distortion) can be selected as the intra prediction mode (e.g., best intra prediction mode) to intra predict the current CU (702).

A spatial geometric partitioning mode (SGPM) can be used in intra prediction. An SGPM can be an intra mode that resembles the inter coding tool of GPM. In the SGPM, a block can be partitioned into two partitions along a partitioning boundary according to a partition mode. In an example, the partition mode is one of partition modes indicated by a partition mode index. Two respective prediction parts can be generated from intra predicted process. In an example, blending (e.g., adaptive blending) is used in the SGPM, and a prediction value of a sample within a certain distance from the partitioning boundary can be determined, according to weights of the two intra prediction modes, using a weighted average of a first prediction value and a second prediction value generated from the two intra prediction modes, respectively.

Figure 8:
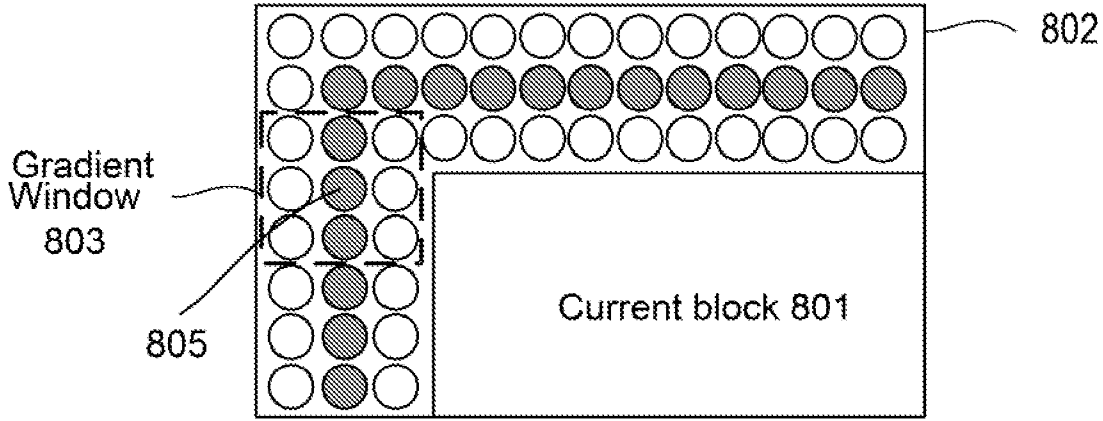
FIG. 8 shows an example of a decoder-side intra mode derivation (DIMD).
Figure 8:
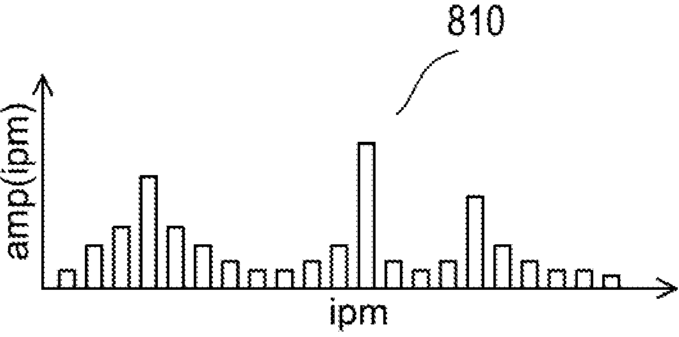

When a decoder-side intra mode derivation (DIMD) is applied, N intra modes can be derived from reconstructed neighbor samples around a current block (801), and the N predictors obtained using the N intra modes can be combined with the planar mode predictor with corresponding weights. The weights can be derived from gradients, such as a histogram of gradient (HoG) computation. FIG. 8 shows an example of the DIMD. The HoG computation can be carried out by applying filters (e.g., horizontal and vertical Sobel filters) on pixels in a template (802) around the current block (801). The template (802) can include reconstructed neighbor samples around the current block (801). In an example, the template has a width of 3. In an example, pixels (marked in gray) in the middle line of the template (802) can be involved in the HoG computation. Referring to FIG. 8, a window (803) around a pixel (805) can be used to determine a gradient associated with the pixel (805). The window (803) can have a size of 3×3 with the pixel (805) in the center of the window (803). A horizontal gradient and a vertical gradient can be obtained using, for example, horizontal and vertical Sobel filters, respectively. A direction or an orientation can be obtained from the horizontal gradient and the vertical gradient. An intra prediction mode (IPM) associated with the direction can be determined. Subsequently, a histogram of IPMs (also referred to as a HoG) (810) can be obtained. The IPMs corresponding to N tallest histogram bars can be selected for the current block (801).

In some examples, one specific intra prediction mode may not be efficient to model the local textures accurately, and a fusion of multiple intra prediction modes can improve the prediction accuracy. For applying a transform on the prediction residual, one intra prediction mode is used to identify the transform set, however, since the prediction is derived using a fusion of multiple intra prediction modes, one individual transform set designed for a specific intra prediction mode may be not efficient. This disclosure includes a set of advanced video coding technologies, such as methods for transform selection for intra prediction fusion (e.g., a fusion of multiple intra prediction modes) to improve the coding efficiency of the fusion of multiple intra prediction modes.

In the disclosure, the term intra prediction fusion can refer to any case when multiple intra prediction modes are used to generate the prediction of a block and derive one residual block. Examples can include, but are not limited to fusion between the DIMD mode and regular intra prediction modes; fusion between the TIMD mode and regular intra prediction modes; the SGPM (or the spatial GPM where two intra prediction modes are signaled for one coding block); fusion of two regular intra prediction modes; and fusion of a cross-component linear model (CCLM)/a convolutional cross-component model (CCCM)/a multi-model linear mode (MMLM) and regular intra prediction modes.

In the disclosure, the term "intra prediction fusion" or a term "a fusion of multiple intra prediction modes" can refer to a case when multiple intra prediction modes are used to predict a block, such as generating a prediction block for the block. A residual block can be derived using the multiple intra prediction modes.

The regular intra prediction modes can include intra prediction modes described with reference to FIGS. 4-5, such as the DC mode, the Planar mode, an intra directional prediction mode (also referred to as an angular prediction mode or an angular mode). The regular intra prediction modes can be used with the reference line 0 in FIG. 6 or another reference line in FIG. 6 that is different from the reference line 0. In an example, the regular intra prediction modes do not include the DIMD mode, the TIMD mode, the SGPM, the CCLM, the CCCM, and the MMLM.

When more than one intra prediction mode (e.g., multiple intra prediction modes) is used for generating the final intra prediction block, i.e., the intra prediction fusion is applied, for applying a transform on the prediction residual, one transform set may be used to select the transform. In an example, the transform set that is associated with a dominant intra prediction mode is used to select the transform. Each intra prediction mode involved in the intra prediction fusion is called (or referred to as) a candidate intra prediction mode. Accordingly, the more than one intra prediction mode or the multiple intra prediction modes used to predict the current block can also be referred to as the multiple candidate intra prediction modes. A current block in a bitstream can be received. The current block is predicted with intra prediction fusion comprising multiple candidate intra prediction modes. A dominant intra prediction mode can be derived from the multiple candidate intra prediction modes. A transform from a transform set associated with the dominant intra prediction mode can be applied for the current block. The current block can be decoded according to the selected transform.

According to an aspect of the disclosure, when the current block is predicted with the multiple candidate intra prediction modes using the intra prediction fusion (or the fusion of multiple intra prediction modes), the dominant intra prediction mode from the multiple candidate intra prediction modes can be derived. A transform set associated with the dominant intra prediction mode can be used to select a transform (e.g., a transform kernel) for the current block. For example, the transform for the current block can be selected from the transform set associated with the dominant intra prediction mode. The dominant intra prediction mode may be based on frequency of a coding characteristic, such as a most frequently used intra prediction mode, an intra prediction mode corresponding to the most frequent edge direction, or an intra prediction mode with a least template matching cost.

The selected transform can be a transform (or a transform kernel) in the transform set associated with the dominant intra prediction mode. The selected transform can be applied to the current block. In an example, a forward transform is performed on the current block in an encoder according to the selected transform. In an example, an inverse transform is performed on the current block in a decoder according to the selected transform.

The multiple candidate intra prediction modes can include one or more of the DC mode, the planar mode, an intra directional prediction mode (also referred to as an angular prediction mode or an angular mode), the DIMD mode, the TIMD mode, the CCLM, the CCCM, and the MMLM.

In one aspect, the transform set includes a primary transform set and/or a secondary transform set.

In an example, the transform set associated with the dominant intra prediction mode includes a primary transform set, a primary transform for the current block is selected in the primary transform set associated with the dominant intra prediction mode. In an example, an inverse primary transform is performed in the decoder on the current block according to the selected primary transform. In an example, a forward primary transform is performed in the encoder on the current block according to the selected primary transform.

In an example, the transform set associated with the dominant intra prediction mode includes a secondary transform set, a secondary transform for the current block is selected in the secondary transform set associated with the dominant intra prediction mode. In an example, an inverse secondary transform is performed in the decoder on the current block according to the selected secondary transform. In an example, a forward secondary transform is performed in the encoder on the current block according to the selected secondary transform.

In an example, the transform set associated with the dominant intra prediction mode includes a primary transform set and a secondary transform set, a primary transform for the current block is selected in the primary transform set and a secondary transform for the current block is selected in the secondary transform set. The transform can include the secondary transform and the primary transform. In an example, an inverse secondary transform is performed in the decoder on the current block according to the selected secondary transform and an inverse primary transform is performed in the decoder on the current block according to the selected primary transform. In an example, a forward secondary transform is performed in the encoder on the current block according to the selected secondary transform and a forward primary transform is performed in the encoder on the current block according to the selected primary transform.

In an example, at least two dominant intra prediction modes are determined from the multiple candidate intra prediction modes used to predict the current block. A primary transform set associated with a first one of the at least two dominant intra prediction modes can be used to select a primary transform for the current block. A secondary transform set associated with a second one of the at least two dominant intra prediction modes can be used to select a secondary transform for the current block.

In another aspect, the dominant intra prediction mode is derived by checking intra prediction modes associated with neighboring coded blocks, and the most frequently used intra prediction mode among the multiple candidate intra prediction modes is identified as the dominant intra prediction mode. The dominant intra prediction mode can be the DIMD, the TIMD, the SGPM, or one of the regular intra prediction modes. The neighboring coded blocks (also referred to as the neighboring blocks) of the current block can include neighboring blocks that are spatially adjacent to the current block.

In an example, the DIMD mode and an angular mode (e.g., a regular intra prediction mode) are used in the fusion of the multiple intra prediction modes where the multiple intra prediction modes include the DIMD mode and the angular mode. A first predictor (e.g., a first prediction block) of the current block is obtained using the DIMD mode, and a second predictor (e.g., a second prediction block) of the current block is obtained using the angular mode. A prediction block (e.g., the final intra prediction block) can be obtained by a weighted average of the first predictor and the second predictor according to respective weights of the DIMD mode and the angular mode. The dominant intra prediction mode can be derived by checking the intra prediction modes associated with the neighboring coded blocks of the current block. If the DIMD mode is the most frequently used intra prediction mode in the multiple candidate intra prediction modes (e.g., the DIMD mode and the angular mode), the DIMD is derived as the dominant intra prediction mode. If the angular mode is the most frequently used intra prediction mode in the multiple candidate intra prediction modes (e.g., the DIMD mode and the angular mode), the angular mode is derived as the dominant intra prediction mode.

In an example, the neighboring blocks are scanned in a certain block size unit, such as 4×4, to collect how frequently each of the candidate intra prediction mode is applied. A neighboring block can include one or more units (e.g., 4×4 units), and prediction mode information (e.g., a prediction mode) associated with each unit (e.g., a 4×4 unit) can be stored for each unit.

As described above, respective frequencies that the multiple candidate intra prediction modes are applied to the neighboring coded blocks (e.g., to code the neighboring blocks) of the current block can be determined, for example, by checking prediction mode information of the neighboring blocks of the current block, such as prediction mode information associated with each unit in each neighboring block of the current block. For example, the frequency of a candidate intra prediction mode is determined based on a number of times the candidate intra prediction mode is stored for unit(s) in each neighboring block. The most frequently used candidate intra prediction mode in the multiple candidate intra prediction modes can be selected as the dominant intra prediction mode. In an example, deriving the dominant intra prediction mode comprises: determining respective frequencies that the multiple candidate intra prediction modes are applied to neighboring coded blocks; and selecting the most frequently applied candidate intra prediction mode in the multiple candidate intra prediction modes as the dominant intra prediction mode.

In another aspect, the dominant intra prediction mode is derived by checking reconstruction samples of the neighboring coded blocks, using either gradient value histogram analysis (e.g., similar to the method used in the DIMD) or template matching (e.g., similar to the method used in the TIMD), and the candidate intra prediction mode associated with the most frequent edge direction as derived from the histogram, or the candidate intra prediction mode with the least template matching cost is derived as the dominant intra prediction mode. In an aspect, deriving the dominant intra prediction mode comprises: deriving the dominant intra prediction mode based on neighboring reconstructed samples of the current block, the neighboring reconstructed samples including reconstructed samples within M lines of the current block. In an example, deriving the dominant intra prediction mode comprises: calculating a histogram of edge directions of the current block based on the neighboring reconstructed samples of the current block where the histogram of edge directions indicates respective frequencies of the edge directions; and selecting a candidate intra prediction mode that is associated with the most frequently used edge direction in the edge directions as the dominant intra prediction mode. The selected candidate intra prediction mode is one of the multiple candidate intra prediction modes. In an example, deriving the dominant intra prediction mode comprises: calculating template matching costs between a current template including the neighboring reconstructed samples of the current block and respective templates of the current template that are indicated by the multiple candidate intra prediction modes; and selecting a candidate intra prediction mode associated with the least template matching cost in the template matching costs as the dominant intra prediction mode, the selected candidate intra prediction mode being one of the multiple candidate intra prediction modes.

The dominant intra prediction mode can be derived based on the neighboring reconstructed samples (e.g., the reconstruction samples of the neighboring coded blocks) of the current block. The neighboring reconstructed samples can include reconstructed samples within M lines from one or more boundaries of the current block (or within M lines of the current block). M can be a positive integer.

In an example, a histogram of edge directions of the current block is calculated based on the neighboring reconstructed samples of the current block. The histogram of edge directions can indicate respective frequencies of the edge directions. The calculation of the histogram of edge directions can be similar to the calculation of the HoG (810) used in the DIMD such as described in FIG. 8. A candidate intra prediction mode that is associated with the most frequently used edge direction in the edge directions can be selected as the dominant intra prediction mode. The selected candidate intra prediction mode can be one of the multiple candidate intra prediction modes. In an example, the candidate intra prediction mode that is associated with the most frequently used edge direction in the edge directions is limited to a certain type of intra prediction mode, such as an angular mode (or a directional intra prediction mode).

In an example, template matching costs between a current template including the neighboring reconstructed samples of the current block and respective templates of the current template that are indicated by the multiple candidate intra prediction modes can be calculated, similar to that used in the TIMD such as described in FIG. 7. A candidate intra prediction mode with the least template matching cost in the template matching costs can be selected as the dominant intra prediction mode. The selected candidate intra prediction mode can be one of the multiple candidate intra prediction modes.

According to aspect of the disclosure, when the current block is predicted with the multiple candidate intra prediction modes, a transform set (e.g., a new transform set) that is different from multiple transform sets associated with the multiple candidate intra prediction modes can be obtained. A transform for the current block can be selected from the obtained transform set. The selected transform can be a transform (or a transform kernel) in the obtained transform set. The selected transform can be applied to the current block. In an example, a forward transform is performed on the current block in an encoder according to the selected transform. In an example, an inverse transform is performed on the current block in a decoder according to the selected transform.

When the more than one intra prediction modes are used for generating the final intra prediction block, i.e., the intra prediction fusion is applied, for applying the transform on the prediction residual, one new transform set $TRS_{NEW}$ is generated using the transform sets associated with the candidate intra prediction modes (e.g., the more than one intra prediction modes or the multiple intra prediction modes). Each intra prediction mode involved in the intra prediction fusion can be referred to as a candidate intra prediction mode.

In one aspect, the transform set (e.g., the obtained transform set or the one new transform set described above) $TRS_{NEW}$ includes the primary transform set and/or secondary transform set.

In an example, the obtained transform set or the one new transform set $TRS_{NEW}$ includes a primary transform set, a primary transform for the current block is selected from the primary transform set (e.g., in the primary transform set). In an example, an inverse primary transform is performed (e.g., in the decoder) on the current block according to the selected primary transform. In an example, a forward primary transform is performed (e.g., in the encoder) on the current block according to the selected primary transform.

In an example, the obtained transform set or the one new transform set $TRS_{NEW}$ includes a secondary transform set, and a secondary transform for the current block is selected from the secondary transform set (e.g., in the secondary transform set). In an example, an inverse secondary transform is performed (e.g., in the decoder) on the current block according to the selected secondary transform. In an example, a forward secondary transform is performed (e.g., in the encoder) on the current block according to the selected secondary transform.

In an example, the obtained transform set or the one new transform set $TRS_{NEW}$ includes a primary transform set and a secondary transform set, and a primary transform for the current block is selected from the primary transform set and a secondary transform for the current block is selected from the secondary transform set. The selected transform can include the selected secondary transform and the selected primary transform. In an example, an inverse secondary transform is performed in the decoder on the current block according to the selected secondary transform and an inverse primary transform is performed in the decoder on the current block according to the selected primary transform. In an example, a forward secondary transform is performed in the encoder on the current block according to the selected secondary transform and a forward primary transform is performed in the encoder on the current block according to the selected primary transform.

The obtained transform set (or the one new transform set) $TRS_{NEW}$ can be generated using transform sets associated with at least two candidate intra prediction modes in the multiple candidate intra prediction modes. The multiple transform sets associated with the multiple candidate intra prediction modes can include the transform sets. The generated transform set (e.g., the obtained transform set or the one new transform set) can include a transform candidate from each of the transform sets. In one aspect, assuming the candidate intra prediction modes (e.g., the multiple candidate intra prediction modes) include candidate intra prediction modes $IPM_0$, $IPM_1$, $IPM_2$, . . . , and $IPM_{N-1}$. N is the number of intra prediction modes (e.g., a number of the multiple candidate intra prediction modes) involved in the intra prediction fusion process, and the associated transform sets for each intra prediction mode in the multiple candidate intra prediction modes is denoted as $TRS_0$, $TRS_1$, $TRS_2$, . . . , and $TRS_{N-1}$, then the new transform set $TRS_{NEW}$ is derived by composing a transform set using transform candidate(s) from each (or partial) of $TRS_0$, $TRS_1$, $TRS_2$, . . . , and $TRS_{N-1}$.

In an example, the new transform set $TRS_{NEW}$ is derived by generating a transform set (e.g., $TRS_{NEW}$) using transform candidate(s) from each of $TRS_0$, $TRS_1$, $TRS_2$, . . . , and $TRS_{N-1}$. In an example, the new transform set $TRS_{NEW}$ is derived by generating a transform set (e.g., $TRS_{NEW}$) using transform candidate(s) from a subset of $TRS_0$, $TRS_1$, $TRS_2$, . . . , and $TRS_{N-1}$. For example, the new transform set $TRS_{NEW}$ is derived based on transform candidate(s) from $TRS_0$, $TRS_1$, and $TRS_{N-1}$.

The new transform set $TRS_{NEW}$ can be generated by including one or more transforms (also referred to as one or more transform candidates) from at least two transform sets in the transform sets $TRS_0$, $TRS_1$, $TRS_2$, . . . , and $TRS_{N-1}$. For example, the new transform set $TRS_{NEW}$ includes one transform in $TRS_0$ and two transforms in $TRS_2$.

In one aspect, the size (e.g., a number of transform candidates) of the new transform set $TRS_{NEW}$ is the same as the size of $TRS_0$, $TRS_1$, $TRS_2$, . . . , $TRS_{N-1}$. In an example, the sizes of $TRS_0$, $TRS_1$, $TRS_2$, . . . , and $TRS_{N-1}$ are identical. In an example, a number of transform candidates of the generated transform set $TRS_{NEW}$ is equal to a number of transform candidates of each of the transform sets, such as $TRS_0$, $TRS_1$, $TRS_2$, . . . , or $TRS_{N-1}$.

In one aspect, the size (e.g., a number of transform candidates) of the new transform set $TRS_{NEW}$ is greater or smaller than $TRS_0$, $TRS_1$, $TRS_2$, . . . , $TRS_{N-1}$. In an example, the number of transform candidates of the generated transform set $TRS_{NEW}$ is different from a number of transform candidates of one of the transform sets, such as $TRS_0$, $TRS_1$, $TRS_2$, . . . , or $TRS_{N-1}$.

In an aspect, when the more than one intra prediction mode are used for generating the final intra prediction block, i.e., the intra prediction fusion is applied, for applying the transform on the prediction residual, one new transform set which is different from the transform set associated with any of the candidate intra prediction modes, is defined and used for the combination of the candidate intra prediction modes that are involved in the intra prediction fusion. For example, the new transform set can be pre-defined. The new transform set may include a transform (also referred to as a transform kernel) that is not included in any transform set that is associated with the multiple candidate intra prediction modes.

In one example, the new transform set includes at least one transform (or transform kernel) that is not included in any transform set that is associated with a single intra prediction mode in the multiple candidate intra prediction modes used in the intra prediction fusion.

Figure 9:
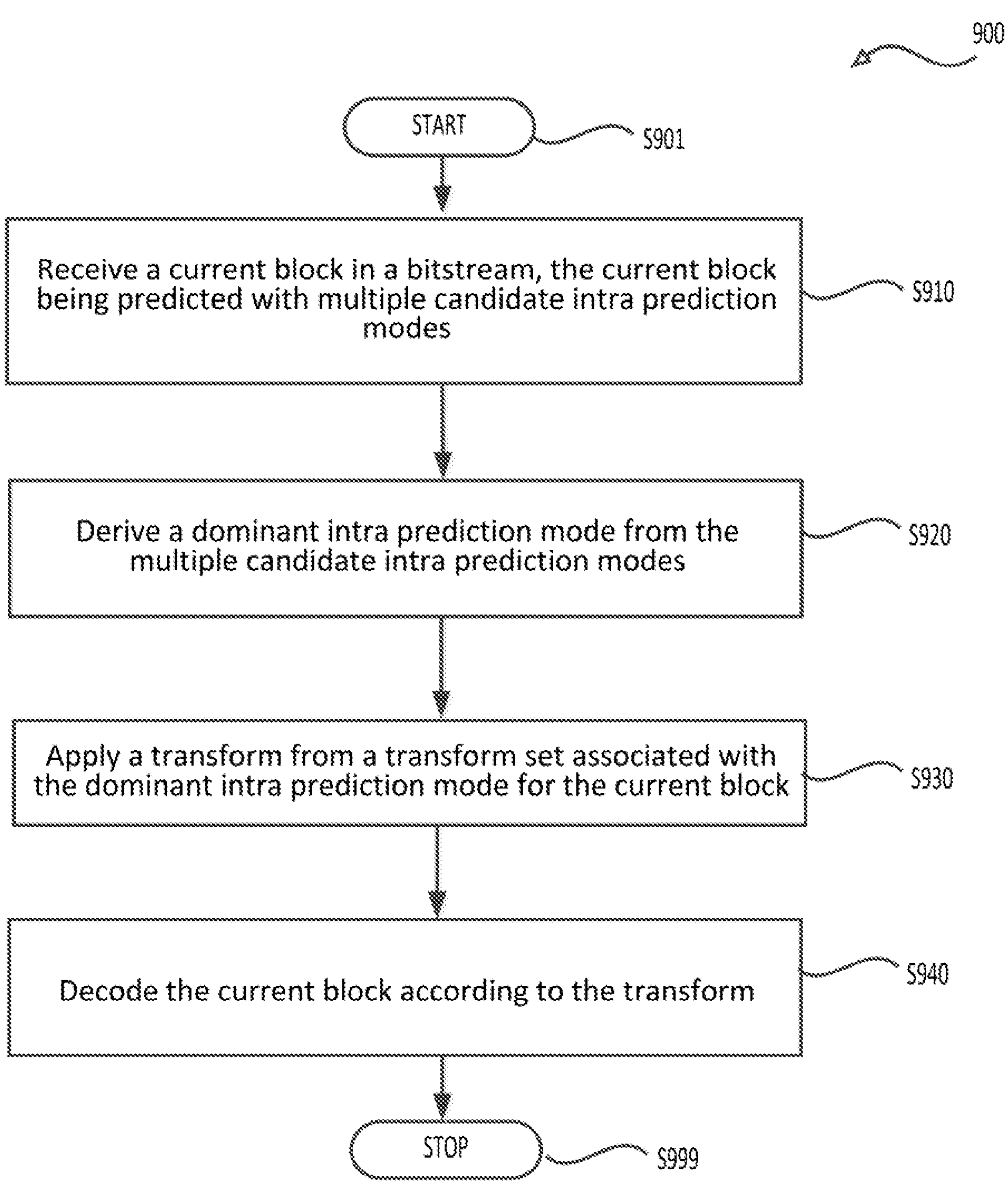
FIG. 9 shows a flow chart outlining a process according to some embodiments of the disclosure.

FIG. 9 shows a flow chart outlining a process (900) according to an embodiment of the disclosure. The process (900) can be used in a video decoder. In various embodiments, the process (900) is executed by processing circuitry, such as the processing circuitry that performs functions of the video decoder (110), the processing circuitry that performs functions of the video decoder (210), and the like. In some embodiments, the process (900) is implemented in software instructions, thus when the processing circuitry executes the software instructions, the processing circuitry performs the process (900). The process starts at (S901) and proceeds to (S910).

At (S910), a current block in a bitstream can be received. The current block is predicted with multiple candidate intra prediction modes, e.g., the current block is predicted with the intra prediction fusion or the fusion of the multiple candidate intra prediction modes as described above.

In an example, the multiple candidate intra prediction modes comprise one or more of a DC mode, a planar mode, an intra directional prediction mode, a decoder-side intra mode derivation (DIMD) mode, a template based intra mode derivation (TIMD) mode, a cross-component linear model (CCLM), a convolutional cross-component model (CCCM), and a multi-model linear mode (MMLM).

At (S920), a dominant intra prediction mode can be derived from the multiple candidate intra prediction modes.

In an example, respective frequencies that the multiple candidate intra prediction modes are applied to neighboring coded blocks are determined, and the most frequently applied candidate intra prediction mode in the multiple candidate intra prediction modes is selected as the dominant intra prediction mode.

In an example, the dominant intra prediction mode is derived based on neighboring reconstructed samples of the current block. The neighboring reconstructed samples include reconstructed samples within M line(s) of the current block.

In an example, a histogram of edge directions of the current block is calculated based on the neighboring reconstructed samples of the current block similar to that used in the DIMD (e.g., shown in FIG. 8). The histogram of edge directions indicates respective frequencies of the edge directions. A candidate intra prediction mode that is associated with the most frequently used edge direction in the edge directions can be selected as the dominant intra prediction mode. The selected candidate intra prediction mode can be one of the multiple candidate intra prediction modes.

In an example, template matching costs between a current template including the neighboring reconstructed samples of the current block and respective templates of the current template that are indicated by the multiple candidate intra prediction modes can be calculated, such as described in FIG. 7 for the TIMD mode. A candidate intra prediction mode associated with the least template matching cost in the template matching costs can be selected as the dominant intra prediction mode. The selected candidate intra prediction mode can be one of the multiple candidate intra prediction modes.

At (S930), a transform from a transform set associated with the dominant intra prediction mode is applied to the current block.

At (S940), the current block is decoded according to the transform.

Steps (S930) and (S940) can be modified. In an example, Steps (S930) and (S940) are modified as below. At (S930), the transform for the current block is selected in the transform set associated with the dominant intra prediction mode.

At (S940), an inverse transform can be performed on the current block according to the selected transform.

Then, the process proceeds to (S999) and terminates.

The process (900) can be suitably adapted. Step(s) in the process (900) can be modified and/or omitted. Additional step(s) can be added. Any suitable order of implementation can be used.

In an example, the transform set associated with the dominant intra prediction mode includes a primary transform set, a primary transform for the current block is selected in the primary transform set associated with the dominant intra prediction mode, and an inverse primary transform is performed on the current block according to the selected primary transform.

In an example, the transform set associated with the dominant intra prediction mode includes a secondary transform set, a secondary transform for the current block is selected in the secondary transform set associated with the dominant intra prediction mode, and an inverse secondary transform is performed on the current block according to the selected secondary transform.

In an example, the transform set associated with the dominant intra prediction mode includes a primary transform set and a secondary transform set, a primary transform for the current block is selected in the primary transform set and a secondary transform for the current block is selected in the secondary transform set. The transform includes the secondary transform and the primary transform. An inverse secondary transform is performed on the current block according to the selected secondary transform and an inverse primary transform is performed on the current block according to the selected primary transform.

Figure 10:
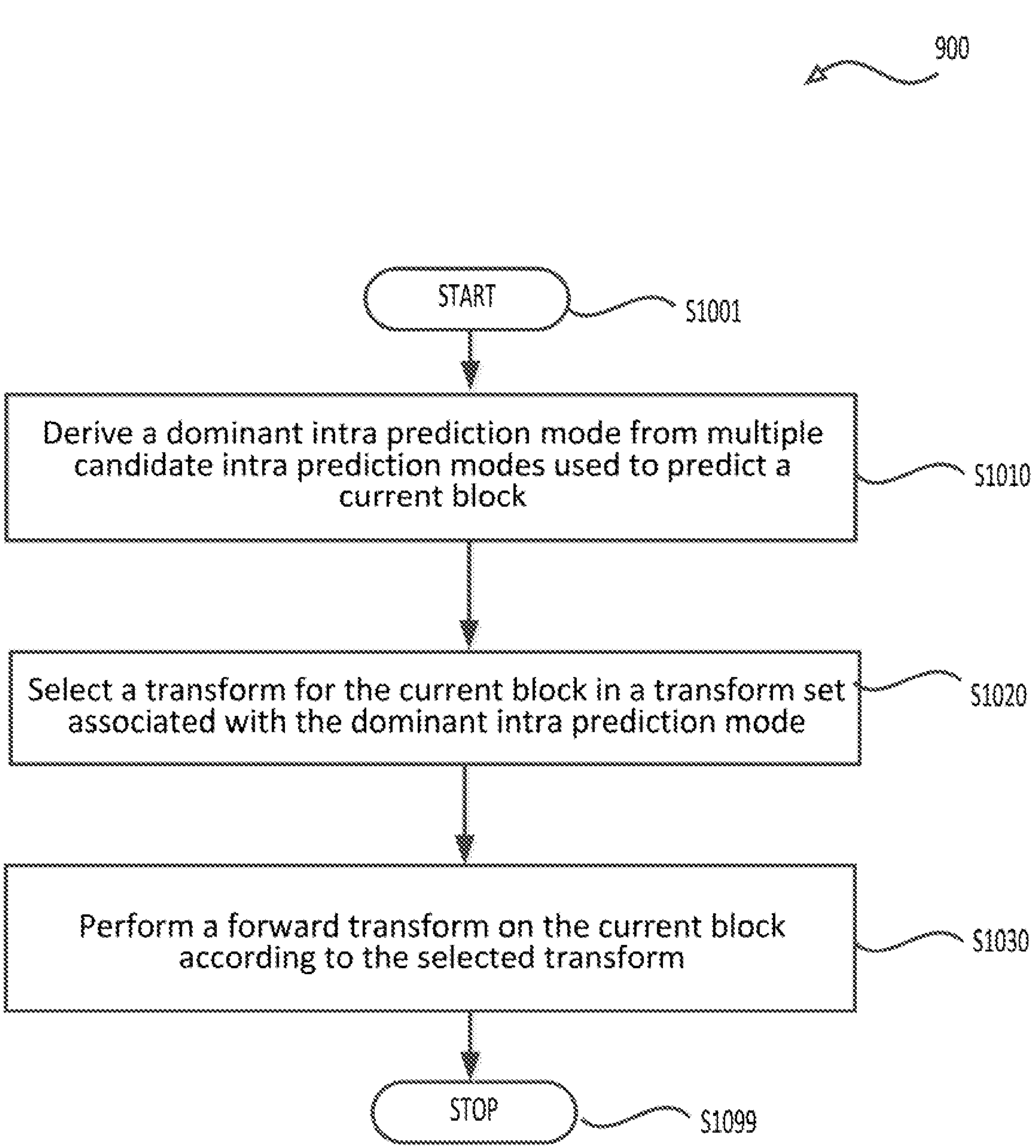
FIG. 10 shows a flow chart outlining another process according to some embodiments of the disclosure.

FIG. 10 shows a flow chart outlining a process (1000) according to an embodiment of the disclosure. The process (1000) can be used in a video encoder. In various embodiments, the process (1000) is executed by processing circuitry, such as the processing circuitry that performs functions of the video encoder (103), the processing circuitry that performs functions of the video encoder (303), and the like. In some embodiments, the process (1000) is implemented in software instructions, thus when the processing circuitry executes the software instructions, the processing circuitry performs the process (1000). The process starts at (S1001) and proceeds to (S1010).

At (S1010), a dominant intra prediction mode from multiple candidate intra prediction modes used to predict a current block can be derived.

At (S1020), a transform for the current block can be selected in a transform set associated with the dominant intra prediction mode.

At (S1030), a forward transform can be performed on the current block according to the selected transform.

Then, the process proceeds to (S1099) and terminates.

The process (1000) can be suitably adapted. Step(s) in the process (1000) can be modified and/or omitted. Additional step(s) can be added. Any suitable order of implementation can be used.

Figure 11:
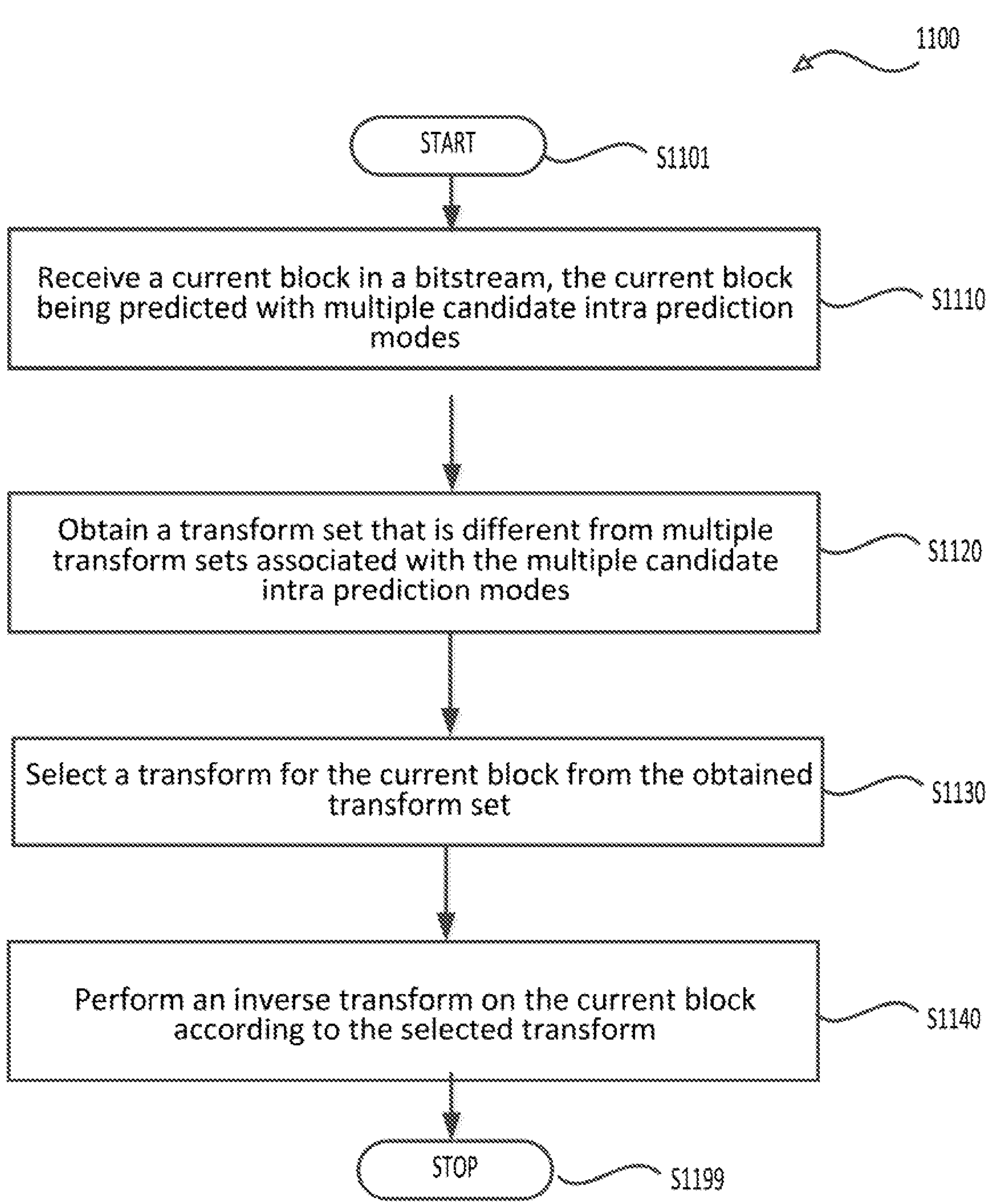
FIG. 11 shows a flow chart outlining a process according to some embodiments of the disclosure.

FIG. 11 shows a flow chart outlining a process (1100) according to an embodiment of the disclosure. The process (1100) can be used in a video decoder. In various embodiments, the process (1100) is executed by processing circuitry, such as the processing circuitry that performs functions of the video decoder (110), the processing circuitry that performs functions of the video decoder (210), and the like. In some embodiments, the process (1100) is implemented in software instructions, thus when the processing circuitry executes the software instructions, the processing circuitry performs the process (1100). The process starts at (S1101) and proceeds to (S1110).

At (S1110), a current block in a bitstream can be received. The current block is predicted with multiple candidate intra prediction modes, e.g., the current block is predicted with the intra prediction fusion or the fusion of the multiple candidate intra prediction modes as described above.

In an example, the multiple candidate intra prediction modes comprise one or more of a DC mode, a planar mode, an intra directional prediction mode, a decoder-side intra mode derivation (DIMD) mode, a template based intra mode derivation (TIMD) mode, a cross-component linear model (CCLM), a convolutional cross-component model (CCCM), and a multi-model linear mode (MMLM).

At (S1120), a transform set that is different from multiple transform sets associated with the multiple candidate intra prediction modes can be obtained.

In an example, the transform set is generated using transform sets associated with at least two candidate intra prediction modes in the multiple candidate intra prediction modes. For example, the generated transform set includes a transform candidate from each of the transform sets. The multiple transform sets include the transform sets associated with at least two candidate intra prediction modes.

In an example, a number of transform candidates of the generated transform set is equal to a number of transform candidates of each of the transform sets.

In an example, a number of transform candidates of the generated transform set is different from a number of transform candidates of one of the transform sets.

In an example, the transform set is pre-defined and includes a transform that is not included in any transform set that is associated with the multiple candidate intra prediction modes.

At (S1130), a transform for the current block is selected from the obtained transform set.

At (S1140), an inverse transform can be performed on the current block according to the selected transform.

Steps (S1130) and (S1140) can be modified. For example, steps (S1130) and (S1140) can include applying the transform from the obtained transform set for the current block; and decoding the current block according to the transform.

Then, the process proceeds to (S1199) and terminates.

The process (1100) can be suitably adapted. Step(s) in the process (1100) can be modified and/or omitted. Additional step(s) can be added. Any suitable order of implementation can be used.

In an example, the obtained transform set includes a primary transform set, a primary transform for the current block is selected from the primary transform set, and an inverse primary transform is performed on the current block according to the selected primary transform.

In an example, the obtained transform set includes a secondary transform set, a secondary transform for the current block is selected from the secondary transform set, and an inverse secondary transform is performed on the current block according to the selected secondary transform.

In an example, the obtained transform set includes a primary transform set and a secondary transform set, and a primary transform for the current block is selected from the primary transform set and a secondary transform for the current block is selected from the secondary transform set. The selected transform can include the selected secondary transform and the selected primary transform. An inverse secondary transform can be performed on the current block according to the selected secondary transform and the inverse primary transform can be performed on the current block according to the selected primary transform.

Figure 12:
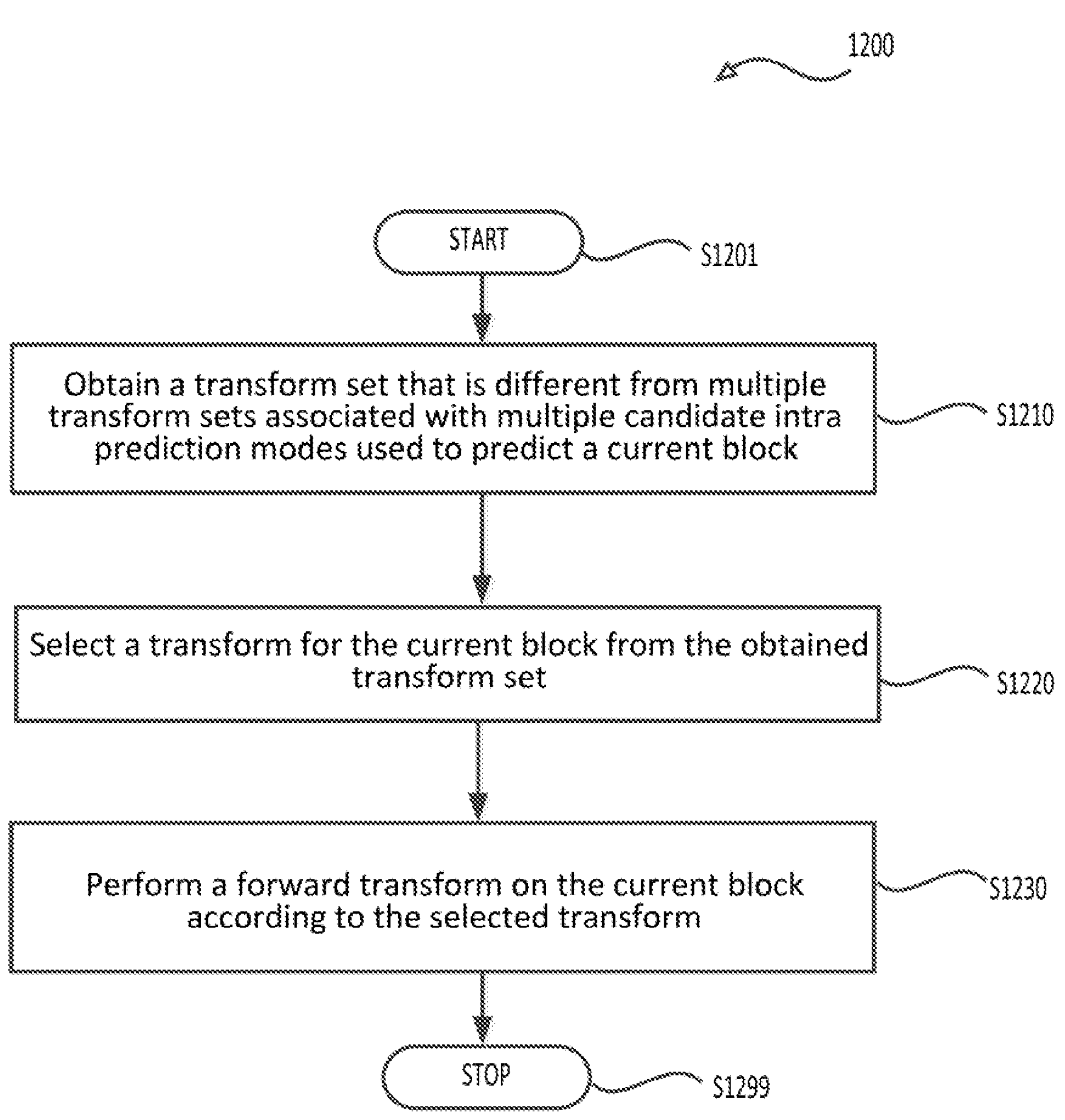
FIG. 12 shows a flow chart outlining another process according to some embodiments of the disclosure.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (103), the processing circuitry that performs functions of the video encoder (303), and the like. In some embodiments, the process (1200) is implemented in software instructions, thus when the processing circuitry executes the software instructions, the processing circuitry performs the process (1200). The process starts at (S1201) and proceeds to (S1210).

At (S1210), a transform set that is different from multiple transform sets associated with the multiple candidate intra prediction modes can be obtained.

At (S1220), a transform for the current block can be selected from the obtained transform set.

At (S1230), a forward transform can be performed on the current block according to the selected transform.

Then, the process proceeds to (S1299) and terminates.

The process (1200) can be suitably adapted. Step(s) in the process (1200) can be modified and/or omitted. Additional step(s) can be added. Any suitable order of implementation can be used.

Aspects and/or examples in the disclosure may be used separately or combined in any order. Each of the methods (or aspects), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
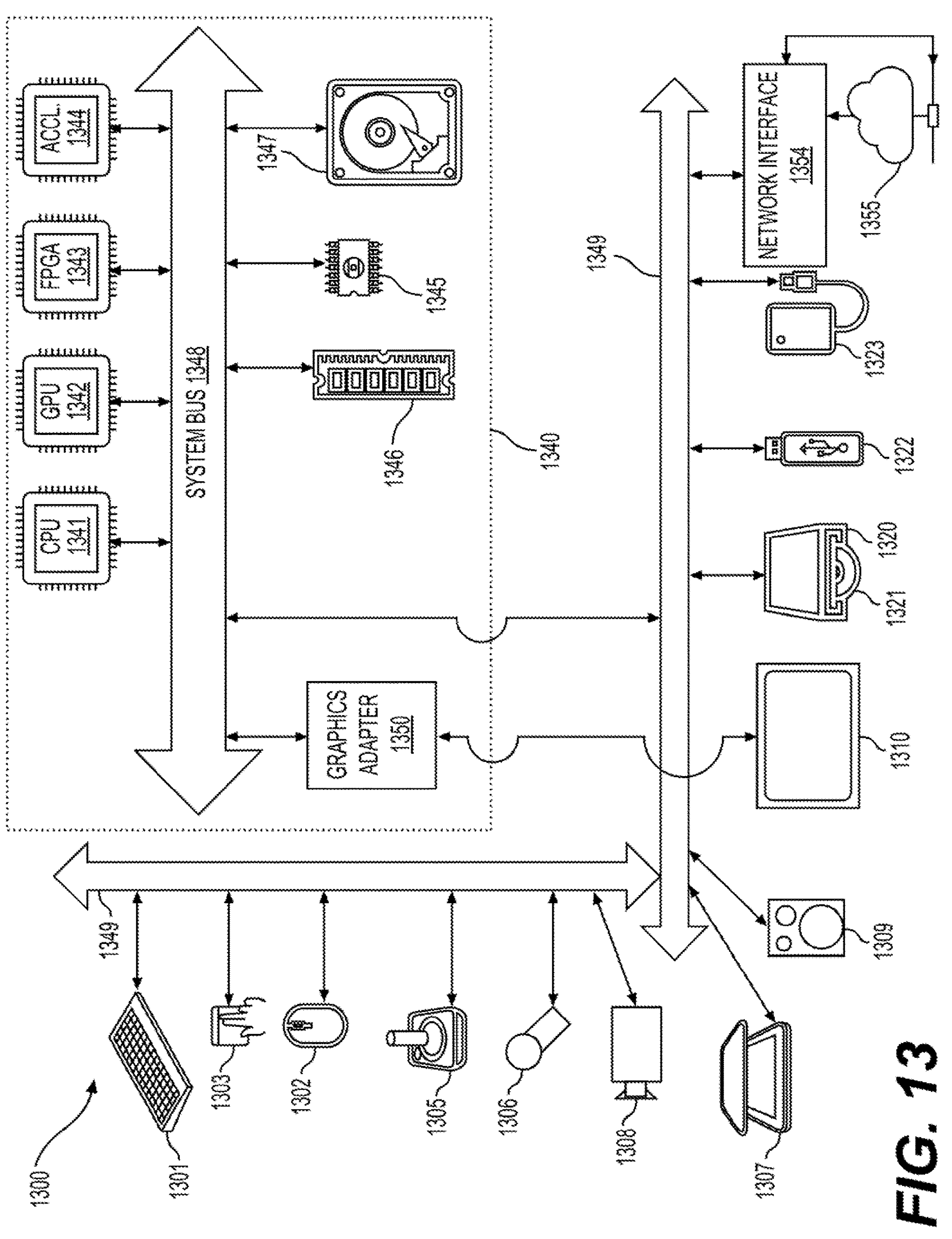
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:

receiving a current block in a bitstream, the current block being predicted with intra prediction fusion comprising multiple candidate intra prediction modes;

deriving a dominant intra prediction mode from the multiple candidate intra prediction modes, the dominant intra prediction mode being an intra prediction mode of the multiple candidate intra prediction modes that is the most frequently applied to predict neighboring blocks of the current block, the neighboring blocks being decoded based on the predicted neighboring blocks;

applying a transform from a transform set associated with the dominant intra prediction mode for the current block; and decoding the current block according to the transform.

2. The method of claim 1, wherein the deriving the dominant intra prediction mode comprises:

determining respective frequencies that the multiple candidate intra prediction modes are applied to the neighboring blocks; and selecting the intra prediction mode that is the most frequently applied in the multiple candidate intra prediction modes as the dominant intra prediction mode.

3. The method of claim 1, wherein the transform set associated with the dominant intra prediction mode includes a primary transform set, and the applying includes:

selecting a primary transform for the current block in the primary transform set associated with the dominant intra prediction mode, and performing an inverse primary transform on the current block according to the selected primary transform.

4. The method of claim 1, wherein the transform set associated with the dominant intra prediction mode includes a secondary transform set, and the applying includes:

selecting a secondary transform for the current block in the secondary transform set associated with the dominant intra prediction mode, and performing an inverse secondary transform on the current block according to the selected secondary transform.

5. The method of claim 1, wherein the transform set associated with the dominant intra prediction mode includes a primary transform set and a secondary transform set, and the applying includes:

selecting a primary transform for the current block in the primary transform set and selecting a secondary transform for the current block in the secondary transform set, the transform including the secondary transform and the primary transform, and performing an inverse secondary transform according to the selected secondary transform and an inverse primary transform on the current block according to the selected primary transform.

6. The method of claim 1, wherein the multiple candidate intra prediction modes comprise one or more of a DC mode, a planar mode, an intra directional prediction mode, a decoder-side intra mode derivation (DIMD) mode, a template based intra mode derivation (TIMD) mode, a cross-component linear model (CCLM), a convolutional cross-component model (CCCM), and a multi-model linear mode (MMLM).

7. A method of video decoding, comprising:

receiving a current block in a bitstream, the current block being predicted with intra prediction fusion comprising multiple candidate intra prediction modes, the multiple candidate intra prediction modes being associated with multiple transform sets;

obtaining a transform set for the intra prediction fusion, the transform set for the intra prediction fusion being different from the multiple transform sets associated with the multiple candidate intra prediction modes;

applying a transform from the obtained transform set for the current block; and decoding the current block according to the transform.

8. The method of claim 7, wherein the obtained transform set includes a primary transform set, and the applying includes:

selecting a primary transform for the current block from the primary transform set, and performing an inverse primary transform on the current block according to the selected primary transform.

9. The method of claim 7, wherein the obtained transform set includes a secondary transform set, and the applying includes:

selecting a secondary transform for the current block from the secondary transform set, and performing an inverse secondary transform on the current block according to the selected secondary transform.

10. The method of claim 7, wherein the obtained transform set includes a primary transform set and a secondary transform set, and the applying includes:

selecting a primary transform for the current block from the primary transform set and selecting a secondary transform for the current block from the secondary transform set, the selected transform including the selected secondary transform and the selected primary transform, and performing an inverse secondary transform on the current block according to the selected secondary transform and the inverse primary transform on the current block according to the selected primary transform.

11. The method of claim 7, wherein the obtaining the transform set comprises:

generating the transform set using transform sets associated with at least two candidate intra prediction modes in the multiple candidate intra prediction modes, the multiple transform sets including the transform sets associated with at least two candidate intra prediction modes.

12. The method of claim 11, wherein the generated transform set includes a transform candidate from each of the transform sets.

13. The method of claim 11, wherein a number of transform candidates of the generated transform set is equal to a number of transform candidates of each of the transform sets.

14. The method of claim 11, wherein a number of transform candidates of the generated transform set is different from a number of transform candidates of one of the transform sets.

15. The method of claim 7, wherein the transform set is pre-defined and includes a transform that is not included in any transform set that is associated with the multiple candidate intra prediction modes.

16. The method of claim 7, wherein the multiple candidate intra prediction modes comprise one or more of a DC mode, a planar mode, an intra directional prediction mode, a decoder-side intra mode derivation (DIMD) mode, a template based intra mode derivation (TIMD) mode, a cross-component linear model (CCLM), a convolutional cross-component model (CCCM), and a multi-model linear mode (MMLM).

17. A method of video encoding, comprising:

obtaining a transform set for intra prediction fusion comprising multiple candidate intra prediction modes, a current block being predicted with the intra prediction fusion, the transform set for the intra prediction fusion being different from multiple transform sets associated with the multiple candidate intra prediction modes;

applying a transform from the obtained transform set for the current block; and encoding, in a bitstream, the current block according to the transform.

* * * * *